US012241040B1

(12) United States Patent
Glaser, II

(10) Patent No.: US 12,241,040 B1
(45) Date of Patent: *Mar. 4, 2025

(54) COMPOSITION AND METHODS FOR STRINGED INSTRUMENT REPAIR

(71) Applicant: Glaser Instruments, LLC, Nashville, TN (US)

(72) Inventor: Joseph Glaser, II, Nashville, TN (US)

(73) Assignee: Glaser Instruments, LLC, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/144,985

(22) Filed: May 9, 2023

Related U.S. Application Data

(63) Continuation of application No. 17/578,411, filed on Jan. 18, 2022, now Pat. No. 11,643,614.

(60) Provisional application No. 63/138,362, filed on Jan. 15, 2021.

(51) Int. Cl.

| | |
|---|---|
| ***C10M 169/04*** | (2006.01) |
| ***C10M 103/02*** | (2006.01) |
| ***C10M 107/38*** | (2006.01) |
| ***C10M 125/10*** | (2006.01) |
| ***C10M 149/08*** | (2006.01) |
| ***C10M 159/02*** | (2006.01) |
| ***C10M 167/00*** | (2006.01) |
| ***G10D 3/12*** | (2020.01) |
| ***G10D 3/22*** | (2020.01) |
| *C10N 30/20* | (2006.01) |
| *C10N 50/00* | (2006.01) |

(52) U.S. Cl.

CPC ...... *C10M 169/048* (2013.01); *C10M 103/02* (2013.01); *C10M 107/38* (2013.01); *C10M 125/10* (2013.01); *C10M 149/08* (2013.01); *C10M 159/02* (2013.01); *C10M 167/00* (2013.01); *G10D 3/12* (2013.01); *G10D 3/22* (2020.02); *C10M 2201/0413* (2013.01); *C10M 2201/08* (2013.01); *C10M 2213/0623* (2013.01); *C10M 2217/026* (2013.01); *C10N 2030/20* (2013.01); *C10N 2050/023* (2020.05)

(58) Field of Classification Search

CPC .............. C10M 103/02; C10M 107/38; C10M 125/10; C10M 149/08; C10M 159/02; C10M 167/00; G10D 3/22; G10D 3/12

See application file for complete search history.

(56) References Cited

U.S. PATENT DOCUMENTS 6,483,017 B1 * 11/2002 Dill ........................ G10D 13/16 84/411 R

FOREIGN PATENT DOCUMENTS

| | | | | |
|---|---|---|---|---|
| GB | 2222298 A * | 2/1990 | ............... | G10D 3/00 |
| WO | WO-2018131159 A1 * | 7/2018 | ................ | F16B 5/10 |

* cited by examiner

*Primary Examiner* — Vishal V Vasisth

(74) *Attorney, Agent, or Firm* — Jonathan D. Spangler; Jay B. Bell

(57) ABSTRACT

A composition and methods for the manufacturing, repair, maintenance and improvement of the nut and saddle of a stringed musical instrument. The composition is a powder configured to be used in nut and saddle slots to create lubricated, durable, aesthetically pleasing, color matched repairs and adjustments. The composition includes multiple substances to achieve strength, color, and lubrication. According to one aspect, the power may have four main components, including a Bulking Agent, a Hardener, a Color, and a Lubricant.

17 Claims, 8 Drawing Sheets

COMPOSITION AND METHODS FOR STRINGED INSTRUMENT REPAIR

CROSS-REFERENCE TO RELATED APPLICATIONS

This application is a continuation of U.S. patent application Ser. No. 17/578,411, filed Jan. 18, 2022, and issued as U.S. Pat. No. 11,643,614 on May 9, 2023, which claims the benefit under 35 U.S.C. § 119(e) of U.S. Patent Application No. 63/138,362 entitled COMPOSITION AND METHODS FOR STRINGED INSTRUMENT REPAIR filed Jan. 15, 2021, the entire contents of which are incorporated herein by reference in their entireties.

BACKGROUND OF THE INVENTION

I. Field of the Invention

The present invention relates generally to stringed musical instruments and, more particularly, to a composition and related methods for repairing the nut and/or saddle of a stringed instrument and with various improvements over the prior art.

II. Discussion of the Prior Art

Stringed instruments include guides or retainers including a “nut” and a “saddle” that are installed, respectively, at the top of an instrument’s fretboard and as or within the bridge. The purpose of the nut and saddle is to align the strings both in vertical respect to the fingerboard or frets, and also to provide two fixed witness points for the strings to vibrate between when played. While, at the bridge end of the string, the saddle slots are almost always the witness point for a played string, the nut may be temporarily replaced by finger contact with selected frets or, in the case of fretless instruments, a position on the fingerboard, as a temporary witness point.

To achieve ideal performance on a musical instrument, the nut and saddle and the string retaining slots that are built into said nut and saddle must be cut at a preferred and intended height with respect to the fret plane or fretless fingerboard. In particular, the nut slots must keep the string far enough away from the frets or fretless fretboard so that, when a string has been struck, it can let that string ring as clearly as when played elsewhere on the neck and, at the same time, be close enough to the fret plane or fretless fingerboard to allow comfortable playing with finger pressure similar to the pressure required to depress the string at any other position. Too low a nut or saddle will result in string rattle when the string is played. Too high a nut or saddle will cause discomfort and sharp intonation due to the excessive stretching of the string required to depress the string to touch the frets or fingerboard, particularly in the region near the nut.

The issues of concern are around the original adjustment of these slots during manufacture, repair, or due to maladjustment or wear. In manufacture, it is not unusual for these slots to be cut too low or spaced poorly with respect to each other. This is also true in situations of repair. As slot position is also a matter of personal preference, repositioning is a common desire. With repeated use, the slots are worn down by the instrument’s strings rubbing against the slot and changing its height and width, creating issues with clear performance.

The prior art techniques to address these nut or saddle issues all suffer certain disadvantages. The first technique, which involves replacement of the entire nut or saddle, is not always ideal because it will change the aesthetic and/or originality of the instrument, compromise tonal qualities, and typically costs more than repair. The second technique, which involves repairing the nut or saddle, requires a technician to a) cut the damaged or incorrect slot with a file, b) adding material such as bovine bone dust and cyanoacrylate in the slot to build it back up; and then c) make a final cut to get the slot to the ideal height. The aforementioned repair makes it possible to change the dimension of the slot but suffers from numerous shortcomings, like low-durability, excessive friction, and/or incorrect color match.

Existing repair techniques are not consistently reproducible or predictable, from both a functional and cosmetic standpoint. Functional issues may include, but are not limited to, the resulting repair causing the strings to be impeded in their movement, which can cause tuning issues. Cosmetic issues may include, but are not limited to, a color mismatch between the native nut or saddle and the repair.

The present invention is directed at overcoming, or at least reducing, the problems of prior art techniques.

SUMMARY OF THE INVENTION

The present invention overcomes the disadvantages of the prior art by providing an improved composition and related methods for the manufacturing, repair, maintenance and improvement of the nut and saddle of a stringed musical instrument. The composition is a powder configured to be used in nut and saddle slots to create lubricated, durable, aesthetically pleasing, color-matched repairs and adjustments. The composition includes multiple substances to achieve strength, color, and lubrication. According to one aspect, the powder may achieve these characteristics by including the following compositions: a Bulking Agent, a Lubricant, a Color Agent (one or mixture of colors), and an optional Hardening Agent.

The bulking agent may comprise any number of suitable compositions for adding bulk or volume, including but not limited to ground bone, bone dust, ground ebony, ebony dust, and other similar materials. The bulking agent provides a foundation for the composition mixture and also a sturdy base.

The lubricant may comprise any number of suitable compositions to provide lubricity, including but not limited to powdered PTFE (polytetrafluoroethylene, such as Teflon™ brand PTFE), graphite, and other similar materials. The lubricant helps create a surface of the repaired string slot with sufficient lubricity such that strings can easily pass through, which ensures an optimized string tension equalization above and below the nut or saddle during tuning or string bending and proper and consistent string intonation while playing.

The color component may comprise any number of suitable compositions for altering the color, including but not limited to powdered colorants and other similar materials. The color component allows matching the existing nut or saddle and making the repair appear “seamless”. In one aspect, the color component may include white colorant to create a bright white nut repair to match a bright white nut, a cream/blond colorant to create a cream nut repair to match a cream-colored nut, and a black colorant to create a black nut repair to match a black nut. More specifically, the colorant is selected to best approximate the color of the respective nut after the glue is applied to the composition of the present invention.

The hardener may comprise any number of suitable compositions for hardening, including but not limited to baking soda and other similar materials. The hardener may serve to absorb the cyanoacrylate or other glue that is used with the composition of the present invention, in order to make a durable repair or adjustment. In one aspect, the hardener may comprise ebony dust, which may also be used as a bulking agent.

The composition of the present invention may be packaged in any suitable container or dispenser. In one embodiment, the container of the composition is configured to enable the focal distribution of the composition within a nut or saddle slot so the cyanoacrylate may be easily added thereto. The composition of the present invention results in a powder that is ideal for nut and saddle repair and adjustment. The four main components can be combined at various ratios to create compounds that are tailored to work on a variety of nut and saddle configurations. According to certain aspects, the ratios by volume of the composition of the present invention may fall within any of the following exemplary ranges:

| | Max Range | | Mid Range | | Low Range | |
|---|---|---|---|---|---|---|
| Composition | % Volume Min | % Volume Max | % Volume Min | % Volume Max | % Volume Min | % Volume Max |
| Bulking | 25% | 80% | 30% | 75% | 35% | 70% |
| Hardening | 15% | 50% | 25% | 45% | 30% | 40% |
| Lubricant | 0.20% | 30% | 0.35% | 27.5% | 0.50% | 25% |
| Colorant | 0.1% | 5% | 0.15% | 4% | 0.20% | 3% |

BRIEF DESCRIPTION OF THE DRAWINGS

Many advantages of the present invention will be apparent to those skilled in the art with a reading of this specification in conjunction with the attached drawings, wherein like reference numerals are applied to like elements and wherein.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

The composition and methods for stringed instrument repair disclosed herein boasts a variety of inventive features and components that warrant patent protection, both individually and in combination.

Figure 1:
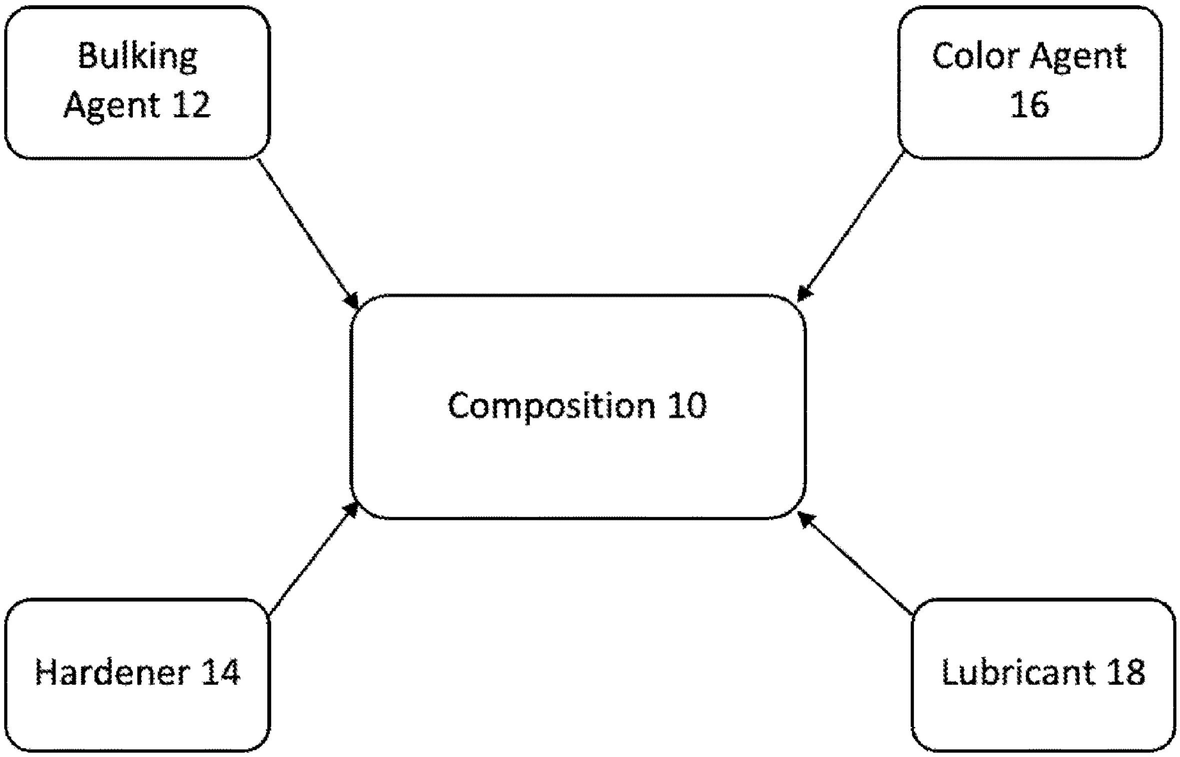
FIG. 1 is a diagram illustrating the primary components forming the composition according to one aspect of the present invention.

FIG. 1 is a diagram illustrating a composition 10 for use in the manufacturing, repair, maintenance, and improvement of the nut and saddle of a stringed musical instrument. The composition 10 is a powder configured to be used in nut and saddle slots to create lubricated, durable, aesthetically pleasing, color-matched repairs and adjustments. The composition 10 includes multiple substances to achieve strength, color, and lubrication. According to one aspect, the composition 10 may comprise a powder having four main components, namely a bulking agent 12, an optional hardener 14, a color agent 16, and a lubricant 18.

The bulking agent 12 may comprise any number of suitable compositions for adding bulk or volume to the composition 10, including but not limited to ground bone, bone dust, ground ebony, ebony dust, and other similar materials. The bulking agent 12 provides a foundation for the composition 10 and also a sturdy base.

The hardener 14 may comprise any number of suitable compositions for hardening, including but not limited to baking soda and other similar materials. The hardener 14 may serve to absorb the cyanoacrylate or other glue that is used with the composition 10 of the present invention, in order to make a durable repair or adjustment. In one aspect, the hardener 14 may comprise ebony dust, which may also be used as a bulking agent 12.

The color component 16 may comprise any number of suitable compositions for altering the color, including but not limited to powdered colorants and other similar materials. The color component 16 allows matching the existing nut or saddle and making the repair appear "seamless". This may be accomplished, for example, by selecting a colorant to best approximate the color of the respective nut after the glue is applied to the composition of the present invention. In one aspect, the color component 16 may include white colorant to create a bright white nut repair to match a bright white nut, a cream/blond colorant to create a cream nut repair to match a cream-colored nut, and a black colorant to create a black nut repair to match a black nut.

The lubricant 18 may comprise any number of suitable compositions to provide lubricity, including but not limited to powdered PTFE (polytetrafluoroethylene, such as Teflon™ brand PTFE), graphite, and other similar materials. The lubricant 18 helps create a surface of the repaired string slot with sufficient lubricity such that strings can easily move or pass through, such that the strings do not stick or otherwise become impeded or restrained by the repaired nut slot while the strings are tuned or played. By providing a lubricious string passage in the repaired nut, the composition 10 of the present invention ensures an optimized string tension equalization on either side of the nut during tuning or string bending, which in turn enables proper and consistent string intonation while playing.

The four main components can be combined at various ratios to create compounds that are tailored to work on a variety of nut and saddle configurations. According to certain aspects, the ratios by volume of the composition 10 may fall within the following exemplary ranges:

| | Max Range | | Mid Range | | Low Range | |
|---|---|---|---|---|---|---|
| Composition | % Volume Min | % Volume Max | % Volume Min | % Volume Max | % Volume Min | % Volume Max |
| Bulking | 25% | 80% | 30% | 75% | 35% | 70% |
| Hardening | 15% | 50% | 25% | 45% | 30% | 40% |
| Lubricant | 0.20% | 30% | 0.35% | 27.5% | 0.50% | 28% |
| Colorant | 0.1% | 5% | 0.15% | 4% | 0.20% | 3% |

Figure 2:
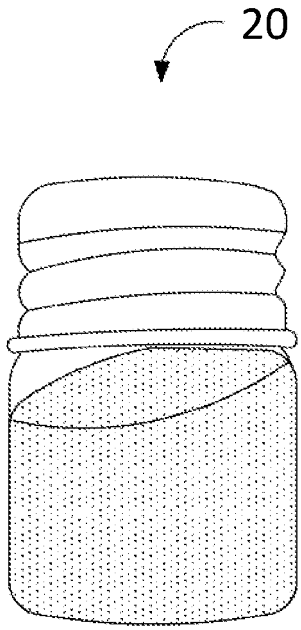
FIGS. 2-3 illustrate a container including the composition of the present invention, both closed (FIG. 2) and open (FIG. 3) according to one aspect of the present invention.
Figure 3:
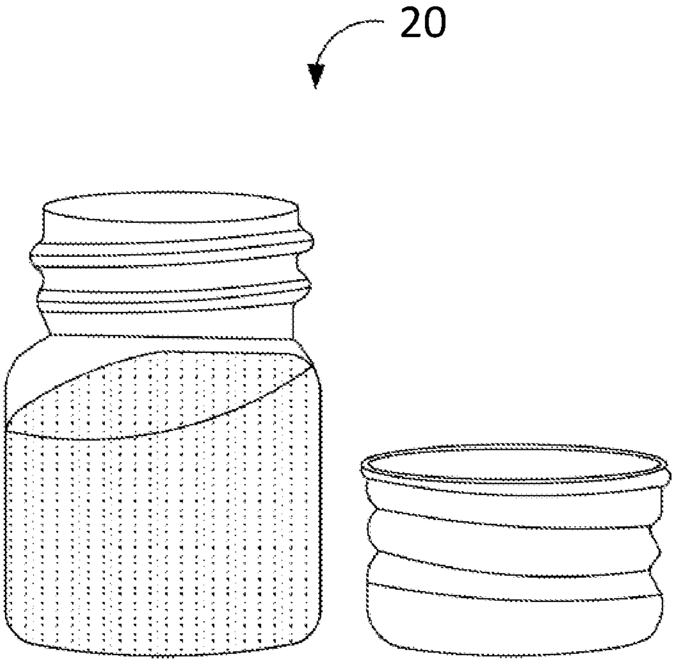

The composition 10 of the present invention may be packaged in any suitable container or dispenser, including but not limited to the container 20 shown in FIGS. 2-3 by way of example only. In one embodiment, the container 20 may be configured to enable the composition 10 to be focally inserted, injected, or otherwise distributed within a nut or saddle slot so the cyanoacrylate or other glue may be easily added thereto.

Figure 4:
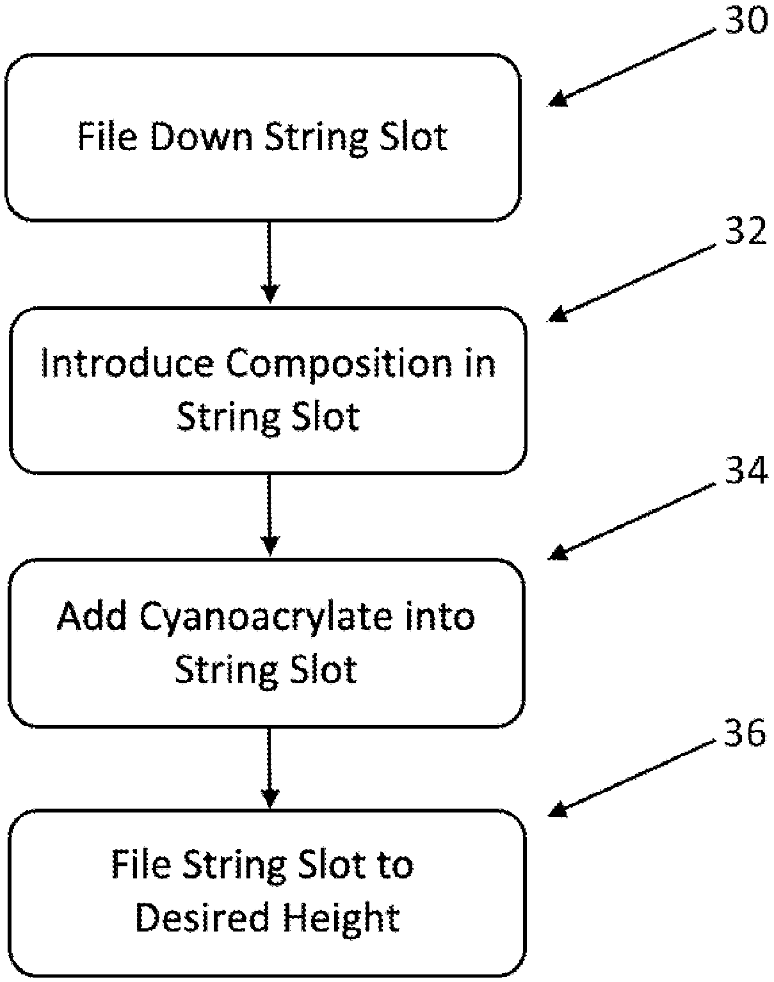
FIG. 4 is a flow chart illustrating the repair steps involving the use of the composition of the present invention.

FIG. 4 is a flow chart illustrating the repair steps involving the use of the composition of the present invention. The first step 30 involves filing down (or etching) the string slot in need of repair. The second step 32 involves introducing the composition 10 into the string slot in need of repair. The third step 34 involves introducing cyanoacrylate to the composition 10 in the slot in need of repair. The fourth step 36 involves filing down (or etching) the string slot to the desired height.

Figure 5:
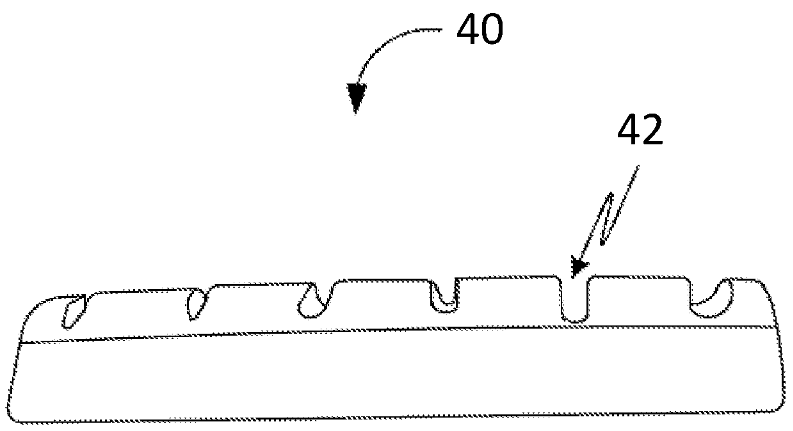
FIG. 5 is an illustration of a nut of a stringed musical instrument showing multiple string slots, one of which needs to be repaired according to an aspect of the present invention.

FIG. 5 is an illustration of a nut 40 of a stringed musical instrument showing multiple string slots, including a string slot 42 in need of being repaired or rebuilt according to an aspect of the present invention. The string slot 42 is in need of repair or rebuild because it is substantially deeper than the adjacent string slots of the nut 40. In that configuration, the string associated with string slot 42 would likely suffer from string buzz due to inadvertent/unwanted contact with the frets of the stringed instrument.

Figure 6:
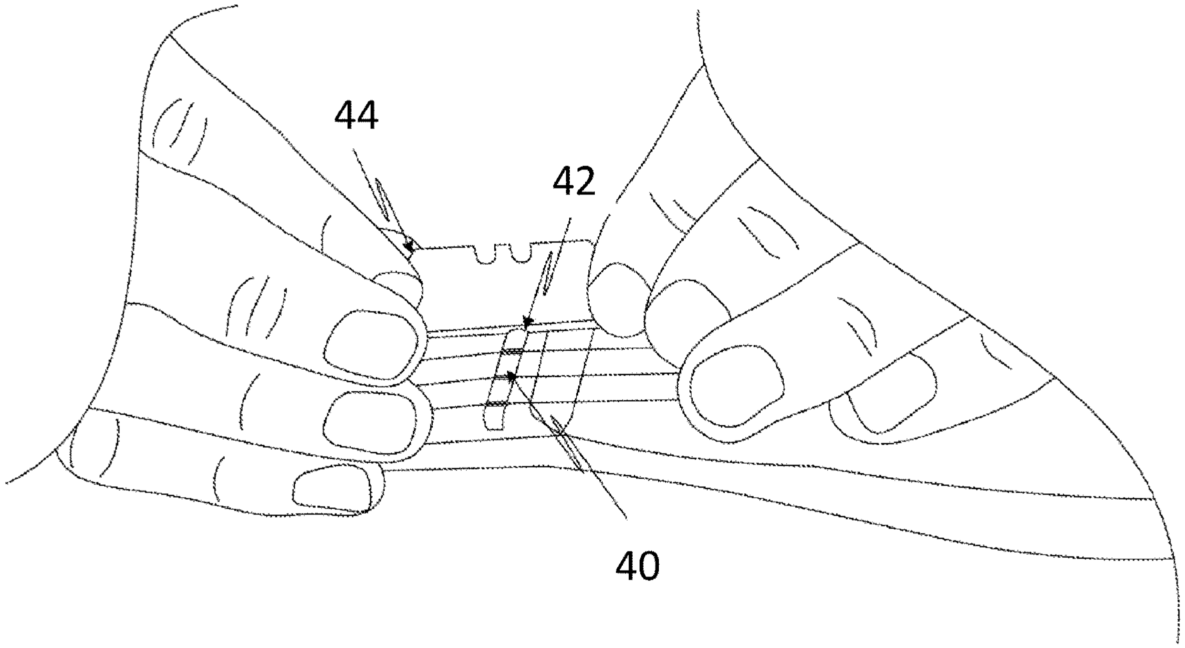
FIG. 6 is an illustration of the nut of FIG. 5 during the first repair step, namely filing down or etching the string slot to promote adhesion according to an aspect of the present invention.

FIG. 6 is an illustration of the nut of FIG. 5 during the first repair step 30, namely filing down the string slot 42 according to an aspect of the present invention. In this embodiment, a razor blade 44 may be used to file or otherwise etch down the string slot 42.

Figure 7:
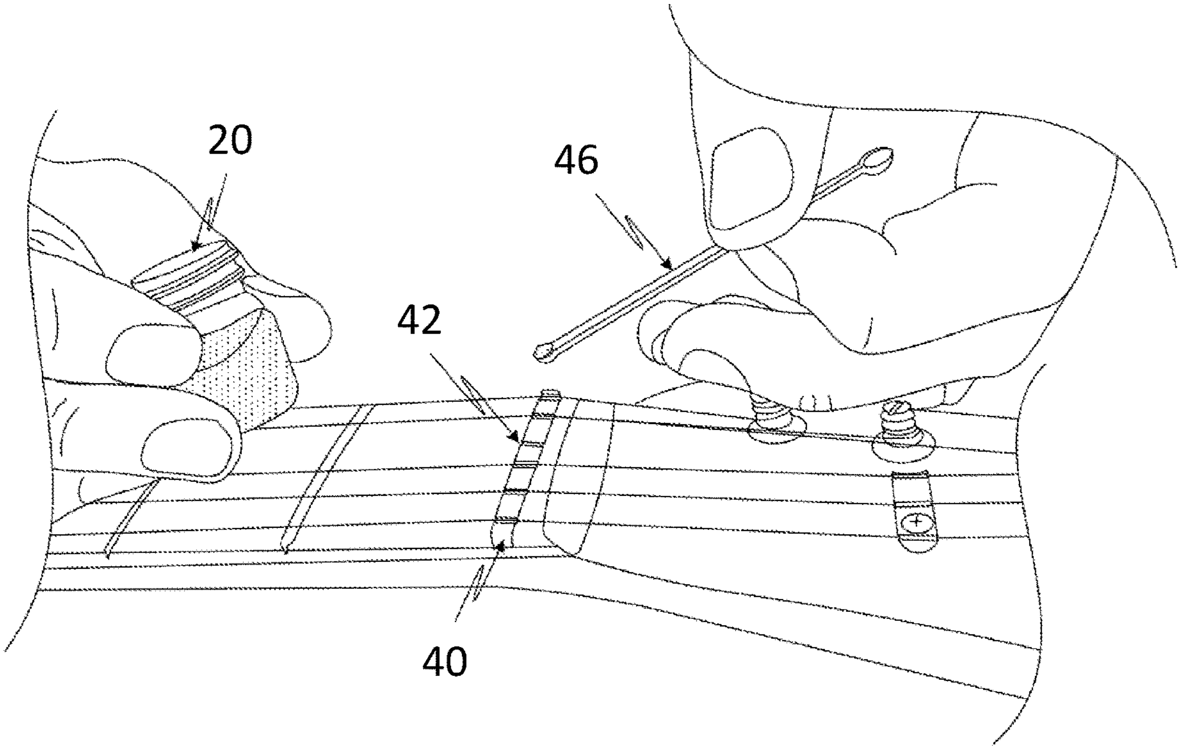
FIG. 7 is an illustration of the nut of FIG. 6 during the second repair step, namely introducing the composition of the present invention into the string slot according to an aspect of the present invention.

FIG. 7 is an illustration of the nut of FIG. 6 during the second repair step 32, namely introducing the composition 10 of the present invention into the string slot 42 according to an aspect of the present invention. In one embodiment, the composition 10 is introduced into the string slot 42 via a spoon 46.

Figure 8:
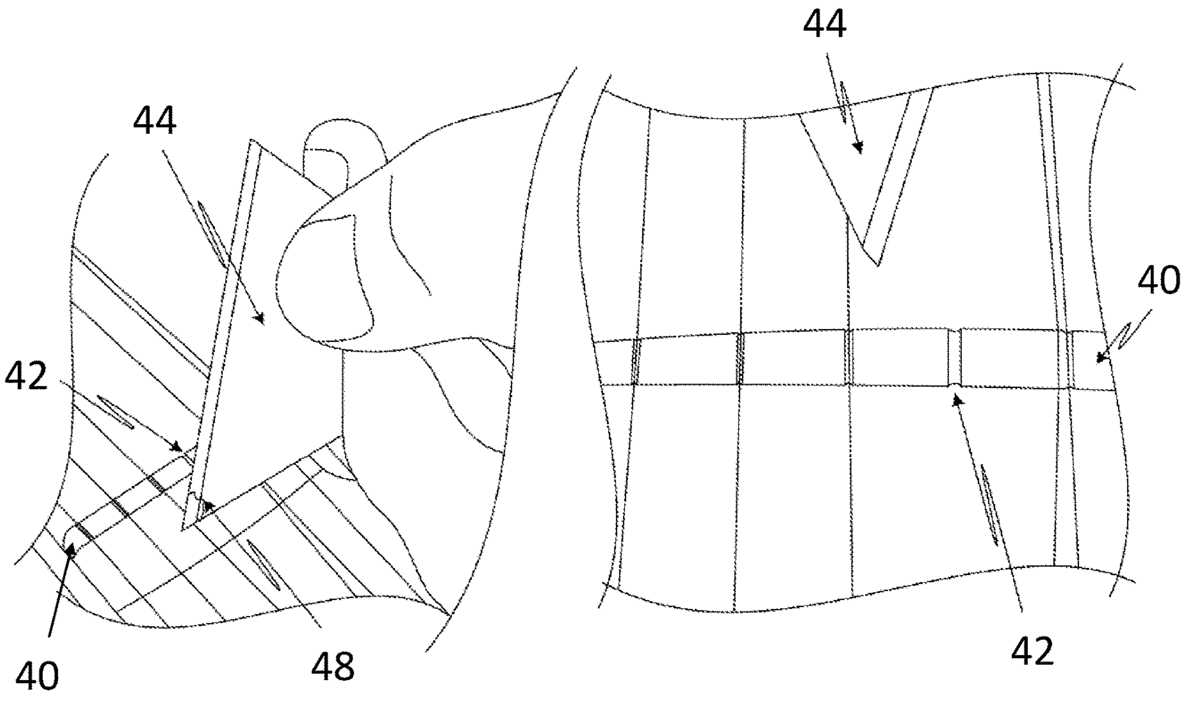
FIG. 8 is an illustration of the nut of FIG. 7 during the third repair step, namely adding cyanoacrylate to the composition within the string slot according to an aspect of the present invention.

FIG. 8 is an illustration of the nut of FIG. 7 during the third repair step 34, namely adding, in this case, cyanoacrylate 48 to the composition 10 within the string slot 42 according to an aspect of the present invention. In one embodiment, the cyanoacrylate 48 may be disposed on the edge of the razor blade 44, as shown, which allows the technician to precisely place the cyanoacrylate 48 within the string slot 42 after the composition 10 has been introduced therein.

Figure 9:
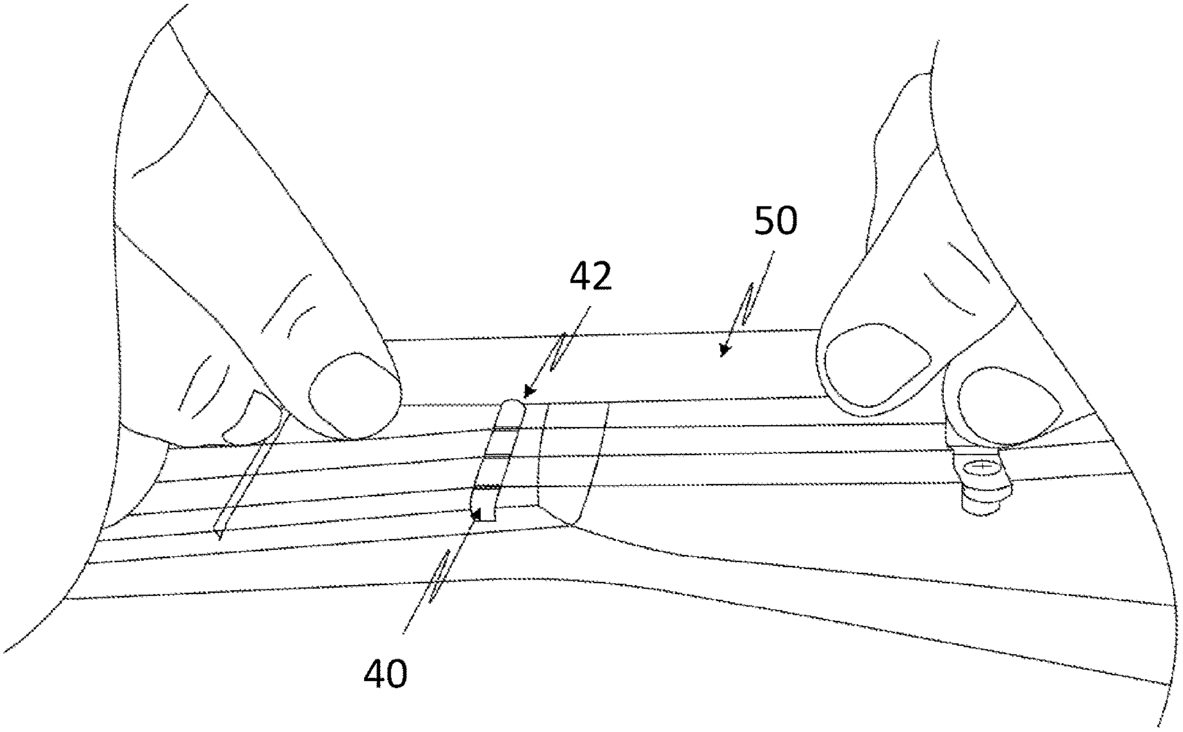
FIG. 9 is an illustration of the nut of FIG. 8 during the final repair step, namely performing a final filing to bring the string slot to the desired height according to an aspect of the present invention.

FIG. 9 is an illustration of the nut of FIG. 8 during the final repair step 36, namely performing a final filing step to bring the string slot 42 to a desired height (depth) and width according to an aspect of the present invention. In one embodiment, the filing or etching is performed via a file 50 that may be translated back and forth within the string slot 42 to create a desired height (depth) and width.

Any of the features or attributes of the above-described embodiments and variations can be used in combination with any of the other features and attributes of the above-described embodiments and variations as desired. From the foregoing disclosure and detailed description of certain preferred embodiments, it is also apparent that various modifications, additions, and other alternative embodiments are possible without departing from the true scope and spirit. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A composition for repairing a string slot in a nut of a musical instrument, comprising:

a bulking agent configured to form a foundation and add bulk to said composition;

a color agent configured to match a color of said nut; and a lubricant configured to add lubricity to said composition; and a hardening agent configured to absorb a glue used with said composition;

wherein said bulking agent, said color agent, said lubricant and said hardening agent are admixed and configured to be introduced into a string slot of a nut of a musical instrument to establish a substrate layer when a glue is thereafter added into said string slot such that an instrument may be used to shape at least one aspect of said substrate layer to create a repaired string slot within said nut, wherein said repaired string slot has lubricity due to said lubricant to enable an optimized string tension equalization on either side of the nut when a string is placed in said repaired string slot and thereafter tuned or played on said musical instrument.

2. The composition of claim 1, wherein said bulking agent comprises at least one of ground bone, bone dust, ground ebony, and ebony dust.

3. The composition of claim 1, wherein said color agent is a powdered colorant selected to match an approximate color of said nut of said musical instrument after said glue dries.

4. The composition of claim 3, wherein said powdered colorant comprises one of a white colorant to create a bright white repaired string slot, a blond colorant to create a cream colored repaired string slot, and a black colorant to create a black repaired string slot.

5. The composition of claim 1, wherein said lubricant is at least one of graphite and polytetrafluoroethylene.

6. The composition of claim 1, wherein said hardening agent is at least one of baking soda and ebony dust.

7. The composition of claim 1, wherein said bulking agent has a ratio by volume in a range of 30% to 75% of said composition, said color agent has a ratio by volume in a range of 0.15% to 4% of said composition, said lubricant has a ratio by volume in a range of 0.35% to 27.5% of said composition, and said hardening agent has a ratio by volume in a range of 25% to 45% of said composition.

8. The composition of claim 1, wherein said bulking agent has a ratio by volume in a range of 35% to 70% of said composition, said color agent has a ratio by volume in a range of 0.2% to 3% of said composition, said lubricant has a ratio by volume in a range of 0.5% to 25% of said composition, and said hardening agent has a ratio by volume in a range of 30% to 40% of said composition.

9. A method of repairing a nut of a musical instrument, comprising the steps of:

(a) increasing at least one dimension of a string slot of said nut to create an expanded string slot;

(b) introducing a composition into said expanded string slot of said nut, wherein said composition is an admixture of: (i) a bulking agent configured to form a foundation and add bulk to said composition; (ii) a color agent configured to match a color of said nut; (iii) a lubricant configured to add lubricity to said composition; and (iv) a hardening agent configured to absorb a glue used with said composition;

(c) adding a glue to said composition after introduction into said expanded string slot to create a substrate layer within said expanded string slot; and (d) shaping at least one aspect of said substrate layer to create a repaired string slot within said nut, wherein said repaired string slot has lubricity due to said lubricant to enable an optimized string tension equalization on either side of the nut when a string is placed in said repaired string slot and thereafter tuned or played on said musical instrument.

10. The method of claim 9, wherein at least one of step (a) and step (d) are performed with a file instrument.

11. The method of claim 9, wherein said bulking agent comprises at least one of ground bone and ground ebony.

12. The method of claim 9, wherein said color agent is a powdered colorant selected to match an approximate color of said nut of said musical instrument after said glue dries.

13. The method of claim 12, wherein said powdered colorant comprises one of a white colorant to create a bright white repaired string slot, a blond colorant to create a cream colored repaired string slot, and a black colorant to create a black repaired string slot.

14. The method of claim 9, wherein said lubricant is at least one of graphite and polytetrafluoroethylene.

15. The method of claim 9, wherein said hardening agent is at least one of baking soda and ebony dust.

16. The method of claim 9, wherein said bulking agent has a ratio by volume in a range of 30% to 75% of said composition, said color agent has a ratio by volume in a range of 0.15% to 4% of said composition, said lubricant has a ratio by volume in a range of 0.35% to 27.5% of said composition, and said hardening agent has a ratio by volume in a range of 25% to 45% of said composition.

17. The method of claim 9, wherein said bulking agent has a ratio by volume in a range of 35% to 70% of said composition, said color agent has a ratio by volume in a range of 0.2% to 3% of said composition, said lubricant has a ratio by volume in a range of 0.5% to 25% of said composition, and said hardening agent has a ratio by volume in a range of 30% to 40% of said composition.

* * * * *